(12) United States Patent
Vasekin et al.

(10) Patent No.: US 7,900,019 B2
(45) Date of Patent: Mar. 1, 2011

(54) DATA ACCESS TARGET PREDICTIONS IN A DATA PROCESSING SYSTEM

(75) Inventors: Vladimir Vasekin, Cambridge (GB); Andrew Christopher Rose, Cambridge (GB); David Kevin Hart, Cambridge (GB); Javed Osmany, Cambridge (GB)

(73) Assignee: ARM Limited, Cambridge (GB)

( * ) Notice: Subject to any disclaimer, the term of this patent is extended or adjusted under 35 U.S.C. 154(b) by 639 days.

(21) Appl. No.: 11/414,547

(22) Filed: May 1, 2006

(65) Prior Publication Data

US 2007/0255927 A1 Nov. 1, 2007

(51) Int. Cl.
*G06F 13/00* (2006.01)

(52) U.S. Cl. ......... 711/213; 711/168; 712/233; 712/237; 712/239

(58) Field of Classification Search .................. 711/168, 711/213
See application file for complete search history.

(56) References Cited

U.S. PATENT DOCUMENTS

| 6,094,713 | A | * | 7/2000 | Khadder et al. | 711/210 |
| 6,826,670 | B2 | * | 11/2004 | Middleton et al. | 711/205 |
| 2004/0205319 | A1 | * | 10/2004 | Pickreign et al. | 711/202 |
| 2005/0144408 | A1 | * | 6/2005 | Ejima et al. | 711/163 |
| 2006/0101299 | A1 | | 5/2006 | Chung | 713/324 |
| 2006/0271741 | A1 | * | 11/2006 | Clark et al. | 711/141 |
| 2007/0113013 | A1 | * | 5/2007 | Knoth | 711/128 |

OTHER PUBLICATIONS

"Memory management unit." Oct. 11, 2005. Retrieved from http://en.wikipedia.org/wiki/Memory_management_unit as archived by www.archive.org on Dec. 31, 2005.*

* cited by examiner

*Primary Examiner* — Yong Choe
(74) *Attorney, Agent, or Firm* — Nixon & Vanderhye P.C.

(57) ABSTRACT

A data processing apparatus having a plurality of memories is provided in which address generation logic (109) outputs to at least one of the plurality of memories a target memory address corresponding to the data to be accessed. Target memory prediction logic (113) outputs a prediction indicating in which one of the plurality of memories a target data is stored. The target memory prediction logic (113) outputs the prediction in the same processing cycle as the output of the target memory address by the address generation logic (109). An associated method is also provided.

18 Claims, 10 Drawing Sheets

DATA ACCESS TARGET PREDICTIONS IN A DATA PROCESSING SYSTEM

BACKGROUND OF THE INVENTION

1. Field of the Invention

This invention relates to data processing systems. More particularly, this invention relates to accessing data corresponding to a target memory address in a data processing system.

2. Description of the Prior Art

It is known to control memory access in data processing systems using memory management logic such as memory protection units and memory management units. Memory protection units are similar to memory management units, but are simple since they do not involve mapping of virtual to physical addresses. In known systems when address generation logic outputs the target memory address of data to be accessed that target memory address is resolved by the management logic to determine whether or not the application program that generated the target memory address is permitted to access the associated memory region and to identify which one of a plurality of physical memories (e.g. cache, tightly coupled memory or main memory) is storing the data to be accessed. Since it takes time for the memory management logic to resolve the target memory address, it typically takes several processing cycles before data corresponding to the target memory address can be located as being stored in a particular one of the plurality of memories and thus be accessed. Accordingly, the data access time can become a time critical path that limits the performance of the data processing system.

There is a requirement for data processing devices that are more compact and more efficient in order to meet the demands of current processing applications and evolving electronic devices. Accordingly, there is a requirement to improve the efficiency of data access to improve the performance of the data processing apparatus and to reduce the circuit area of the logic used to perform data accesses in these devices.

SUMMARY OF THE INVENTION

According to a first aspect the present invention provides a data processing apparatus operable access a plurality of memories, said data processing apparatus comprising:

address generation logic operable to output to at least one of said plurality of memories, a target memory address corresponding to data to be accessed;

target memory prediction logic operable to output a prediction indicating in which one of said plurality of memories said target data is stored;

wherein said target memory prediction logic is operable to output said prediction in the same processing cycle in which said address generation logic outputs said target memory address.

The present invention recognises that the efficiency of a data processing system can be improved by reducing the typical data access time by generating a prediction of the memory unit in which data associated with a target memory address is stored in parallel with outputting the target memory address (i.e. outputting the prediction in the same processing cycle as output of the target memory address). Thus the prediction can be used to start L1 cache arbitration in advance and to commence tightly coupled memory (TCM) or cache memory look-up as soon as the target memory address is generated by the address generation logic. Prediction of the target memory associated with the target memory address in this way provides a performance benefit for the data processing apparatus.

In one embodiment the target memory address is a virtual memory address and in another embodiment the target memory address is a physical memory address. Output of a target memory prediction in the same processing cycle as output of the target memory address provides performance benefits both in systems that use virtual memory to increase the available storage capacity and also in systems such as embedded cores whose memory maps typically involve only physical memory addresses.

In one embodiment the data processing apparatus comprises memory management logic operable to determine in which of the plurality of memories data corresponding to the target memory address resides. This allows target memory addresses to be efficiently resolved in a manner that is reliable and prevents output of data from incorrect memory locations. This in turn prevents corruption of data processing tasks. In some such embodiments the memory management logic is memory protection unit, but in alternative embodiments the memory management logic is a memory management unit operable to translate a virtual memory address to a physical memory address.

It will be appreciated that the target memory prediction could be performed in a number of different ways, for example, using principles such as temporal locality and spatial locality as used in known cache systems. However, in one embodiment the target memory prediction logic makes the prediction in dependence upon a base address value specifying location in a memory map of an address range associated with a respective one of the plurality of memories. Use of the base address value is simple to implement yet provides for fast target memory prediction with a high likelihood of accuracy. This is because it can be reasonably assumed that when a base register is pointing to a particular memory unit, the final memory address is also likely to point to that same memory unit.

In one embodiment the target memory prediction logic makes the target memory prediction in dependence upon the size of at least one of the plurality of memories in addition to the base address value. This provides for simple yet accurate target memory prediction that has more flexibility, since it is adaptable to different memory configurations having a range of different memory sizes.

In one embodiment the target memory prediction logic makes the prediction using an address mask corresponding to the memory size of the memory unit corresponding to a respective one of the plurality of memories being considered as the target memory. Use of an address mask in this way enables a range of different memory sizes to be easily accommodated.

In one embodiment the target prediction logic comprises a comparator operable to compare at least a portion of the target memory address with at least a portion of a predetermined base address value to perform the prediction. Such logic is simple to implement yet performs a reliable prediction. It enables a given target memory address can be compared in parallel with a plurality of possible predetermined base address values corresponding to the respective plurality of memories in the data processing apparatus.

In one embodiment the memory management logic comprises logic operable to determine if the prediction output by the target memory prediction logic is correct and to output a prediction confirmation signal to the data processing apparatus in a processing cycle subsequent to the same processing cycle (in which both said target memory address and said prediction are output).

In one embodiment the data processing apparatus comprises misprediction recovery logic operable to resolve a misprediction by the target memory prediction logic if the prediction confirmation is not received. This prevents data associated with incorrect data accesses propagating and corrupting the data processing operations.

In one embodiment the data processing apparatus is operable in response to receipt of the prediction confirmation signal to output data accessed in accordance with the prediction in a processing cycle immediately following the subsequent processing cycle to that in which both the target memory address and the prediction are output. This ensures that the data output by the data processing system is the data actually requested by the address generation logic and not data having a corresponding memory address sourced from a different (incorrect) memory unit.

In one embodiment the data processing apparatus is operable to output a further target memory address in the processing cycle immediately following the subsequent processing cycle. This improves the efficiency of data accessing processes yet does not compromise the previous data access.

In one embodiment the target memory prediction logic is operable to obtain the size of at least one of the plurality of memories from the memory management logic. Since the memory management logic typically maintains a record of the size of each of the memory units of the data processing system, it is straightforward to utilise this information in order to perform the target memory prediction.

In an alternative embodiment the target memory prediction logic is operable to obtain the size of at least one of the plurality of memories from at least one control register associated with the respected one of the plurality of memories. This means that the data processing apparatus can obtain the information locally rather than issuing a request to the memory management logic to obtain the size information. This improves efficiency.

In one embodiment the data processing apparatus is operable to set at least one value in the at least one control register to the current target memory address when the current prediction is determined to be incorrect. This increases the efficiency of the system by decreasing the likelihood of a subsequent misprediction and effectively amounts to a correction of the address ranges maintained by the at least one control register.

According to a second aspect, the present invention provides a data processing method for accessing data from at least one of a plurality of memories associated with a data processing apparatus, said method comprising:

outputting to at least one of said plurality of memories, a target memory address corresponding to data to be accessed;

outputting a prediction indicating in which one of said plurality of memories said target data is stored;

wherein said prediction is output in the same processing cycle in which said target memory address is output.

According to a third aspect, the present invention provides a computer program product embodied on a computer-readable medium, said computer program product comprising:

address generation code operable to output to at least one of said plurality of memories, a target memory address corresponding to data to be accessed;

target memory prediction code operable to output a prediction indicating in which one of said plurality of memories said target data is stored;

wherein said target memory prediction code is operable to output said prediction in the same processing cycle in which said address generation code outputs said target memory address.

According to a fourth aspect, the present invention provides a data processing apparatus operable access a plurality of means for data storage, said data processing apparatus comprising:

means for address generation operable to output to at least one of said plurality of means for data storage, a target memory address corresponding to data to be accessed;

means for target memory prediction operable to output a prediction indicating in which one of said plurality of means for data storage said target data is stored;

wherein said means for target memory prediction is operable to output said prediction in the same processing cycle in which said means for address generation outputs said target memory address.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1A:
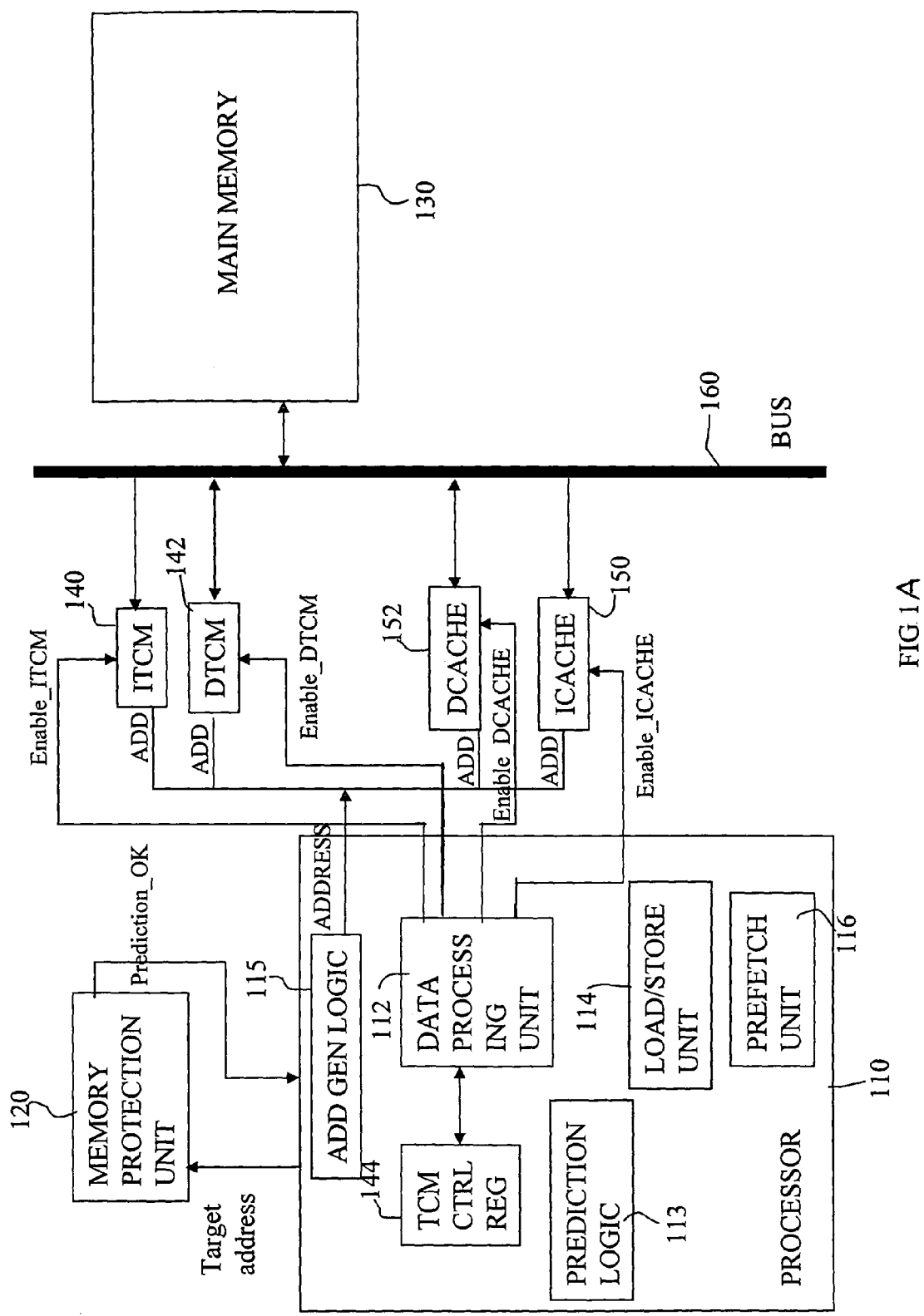
FIG. 1A schematically illustrates a data processing system having target memory prediction logic.

FIG. 1A schematically illustrates a data processing system. The system comprises a processor 110 having a data processing unit 112, a load/store unit 114 and a prefetch unit 116; prediction logic 113; address generation logic 115; a memory protection unit 120; a main memory 130; an Instruction Tightly Coupled Memory (ITCM) 140; a Data Tightly Coupled Memory (DTCM) 142; a TCM control register 144;

an Instruction cache (I cache) 150 and a data cache (D cache) 152. A plurality of communication channels are provided by a common bus 160.

The processor 110 performs data processing operations using the data processing unit 112 and those operations are defined by program instructions that operate on data values stored in a register bank (not shown). Instructions for execution and data associated with individual program instructions are prefetched prior to execution using the prefetch unit 116. The prefetch unit supplies data to an execution pipeline (not shown) for subsequent execution according to an execution ordering. The load/store unit 114 is operable to retrieve data from the main memory 130 or the one of the tightly coupled memories 140, 142 or caches 150, 152 for storage in registers of the register bank. The load/store unit 114 is also operable to store the results of processing operations back to main memory 130.

The memory protection unit 120 is operable to prevent one process from corrupting the memory of another process running concurrently on the processor 110. It comprises hardware consisting of a memory management unit and system software and is operable to allocate distinct memory portions to different processes and to handle exceptions arising when a process tries to access memory outside its permitted bounds. The memory protection unit 120 also prevents access to memory reserved for use by the operating system as a safeguard against application processes corrupting operating system data.

The memory protection unit 120 defines a plurality of protection regions whose properties are configured by writing to protection unit registers. This provides a level of control over memory properties and enables different memory regions with different attributes to be specified.

The memory protection unit 120 manages the physical memory address space. The memory protection unit 120 defines attributes associated with each of the plurality of protection regions by writing to respective protection unit registers.

Figure 1B:
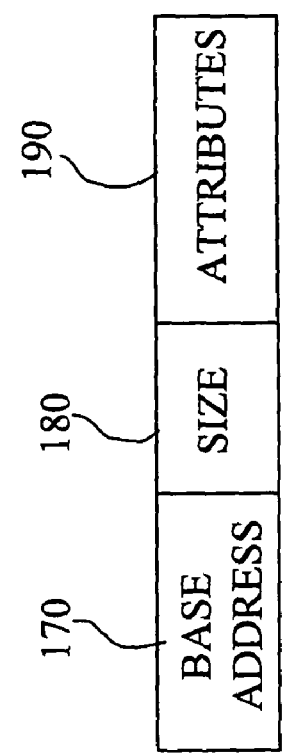
FIG. 1B schematically illustrates a memory region specifier as used in known memory protection units.

FIG. 1B schematically illustrates a memory region specifier as used in known memory protection units. The memory region specifier comprises a base address field 170, a size field 180 and an attributes field 190. One such memory region specifier is provided for each of the memory regions defined by the memory protection unit 120 (typically in the range from 8 to 16). The base address field 170 specifies the address of the first byte of the associated memory region. The size field 180 specifies the size of the associated memory region which in this arrangement, can be in the range from 4 kbytes to 8 Mbytes. The attributes field 190 specifies memory attributes associated with the memory region. These memory attributes comprise whether a user level or a privileged level of access is permitted; an indication as to whether the memory region is readable and/writable; an indication of whether the memory region is cacheable or non-cacheable and an indication of whether the memory region is bufferable or non-bufferable.

Although the embodiment of FIG. 1A has a memory protection unit 120, alternative embodiments comprise a memory management unit. Memory management units are similar to memory protection units, but are more complex since they involve mapping of virtual memory addresses to physical memory addresses and use translation tables. Memory management units divide the memory address space into portions known as pages and each page can be made to reside in any location of the physical memory and can be flagged as being protected. Use of virtual memory addresses and memory pages by the memory management unit enables applications to use the linear virtual memory address space to access and store data from a fragmented physical memory space. Each process is given a page table to define valid addresses and to map them to physical memory. If a process is accessing a virtual memory location that is not mapped by a page table a page fault will occur. Page faults occur if a process tries to access memory that it should not have access to or if that particular application's memory has been swapped out to another form of storage. If the memory has been swapped out then it can be swapped back into main memory to access the data.

When the address generation logic 115 of the processor 110 generates a memory address that it is desired to access this memory address is supplied to the memory protection unit 120 to resolve the location associated with the generated memory address and to determine whether access to that memory location is allowable. It is not known a priori whether a generated target memory address corresponds to data stored in:—the main memory 130; the ITCM 140; the DTCM 142; the I cache 150; or the D cache 152. Accordingly, in known systems the processor 110 typically outputs the generated target memory address to each of the ITCM 140, the DTCM 142, the I cache 150 and the D cache 152 as shown in FIG. 1A. Furthermore the data processing unit 112 is operable to output an enable signal to each of these memory modules 140, 142, 150, 152, but the data for output is not selected (via the appropriate enable signal) until the memory protection unit 120 has looked up the target address to determine the associated physical memory unit from which data should be retrieved. However, the prediction logic 113 according to the present technique is operable to predict the location of the target data in the same processing cycle that the processor 110 outputs the target memory address.

The ITCM 140 and DTCM 142 are memory units for instructions and data respectively and each of these units is connected directly to the common bus 160. Tightly coupled memories are typically used to store data and instructions for which a deterministic access time is required. The ITCM 140 and DTCM 142 each present a contiguous address space to a programmer that can be used to store data or instructions. A tightly coupled memory can be used as if it were a particular portion of the main memory 130 (i.e. the data values in the tightly coupled memory are not replicated in the main memory), or alternatively the data values to be placed in the DTCM 140 and the instructions to be placed in the ITCM 140 can be copied from the main memory.

The TCM control register 144 (see FIG. 1) within the data processing apparatus 110 keeps a record of the address range of data values placed in the DTCM 142 and the instructions placed in the ITCM 140 so that it can be determined which data or instructions are stored therein. The I cache 150 and D cache 152 are used to store frequently-accessed instructions and data respectively and serve to reduce the number of processing cycles required to retrieve that data compared to retrieving the data directly from main memory 130. Both the ITCM 140 and I cache 150 are operable to receive instructions from the main memory via the common bus 160 whereas the DTCM 142 and the D cache 152 have bi-directional communication with the common bus 160 such that they can receive data from the main memory 130 as well as output data to the main memory 130.

Although the embodiment of FIG. 1A shows address generation logic 115 and prediction logic 113 implemented in hardware. In alternative embodiments, these two logic units 113, 115 as well as others of the units in the system of FIG. 1A are implemented at least partly in software.

Figure 2:
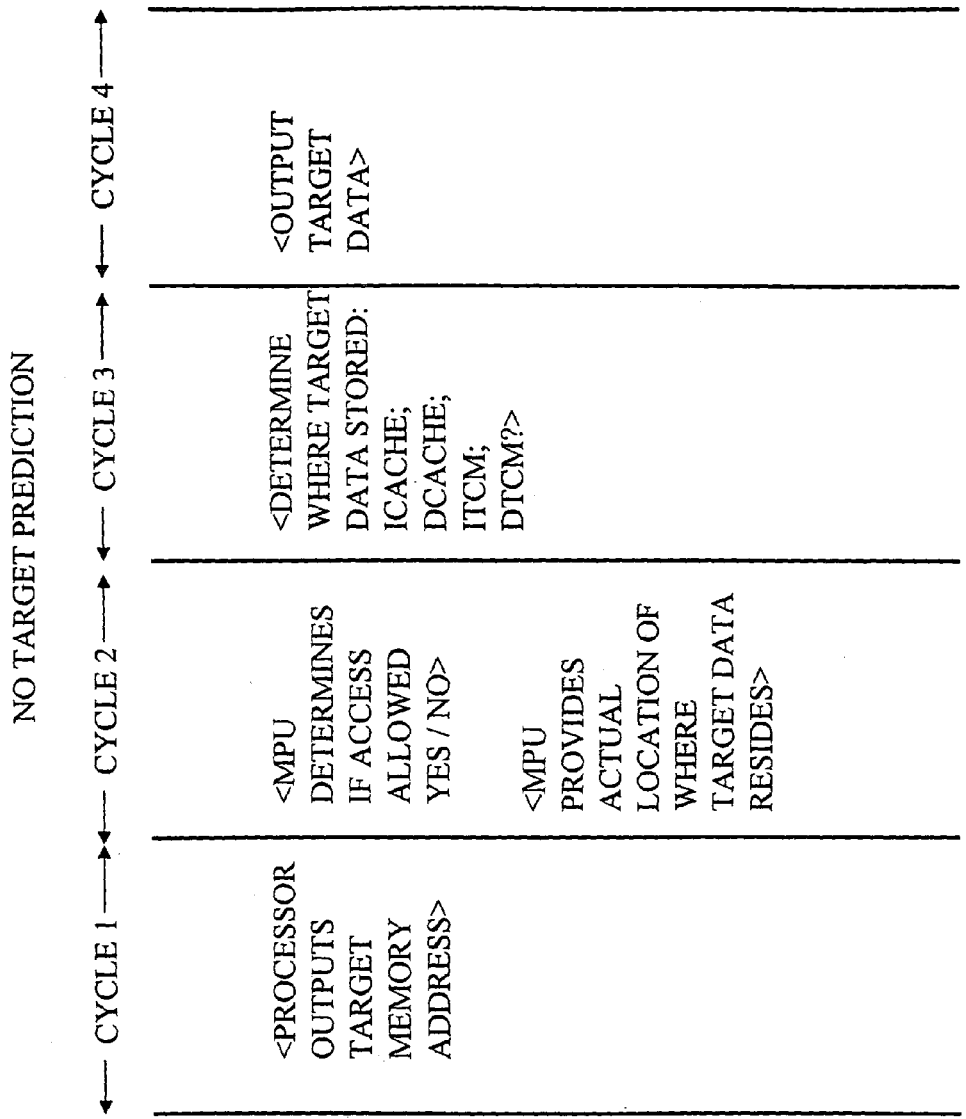
FIG. 2 schematically illustrates a cycle timing diagram representing how the processor of FIG. 1A retrieves data from memory in a known system which no target memory prediction is performed.

FIG. 2 schematically illustrates a cycle timing diagram representing how the processor 110 (see FIG. 1A) retrieves data from memory in a known system where no target memory prediction is performed.

In a first processing cycle, the processor 110 outputs the target memory address from which it is desired to retrieve data. In a second processing cycle, the memory protection unit 120 resolves the memory address generated by the processor 110 to determine whether or not access to the physical memory location associated with that target memory address is allowed. Also in the second processing cycle, the memory protection unit 120 informs the processor of the actual location of the target data resides i.e. one of the ITCM 140, DTCM 142, I cache 150, D cache 152 or main memory 130.

In a third processing cycle, the processor 110 receives from the memory protection unit 120 information specifying the physical location of where the target data resides and thus the processor 110 determines whether that target data is stored in the ITCM 140, DTCM 142, I cache 150 or D cache 152. The data processing unit 112 enables output of data from the appropriate one of these memory units and supplies that data to the relevant application process in the subsequent processing cycle i.e. the fourth processing cycle. Thus it can be seen from FIG. 2, that without target prediction, each data load will take at least four clock cycles of the processor 110. Note that if the memory protection unit 120 determines that the data is stored in the main memory then access to that target data will take even longer.

Figure 3:
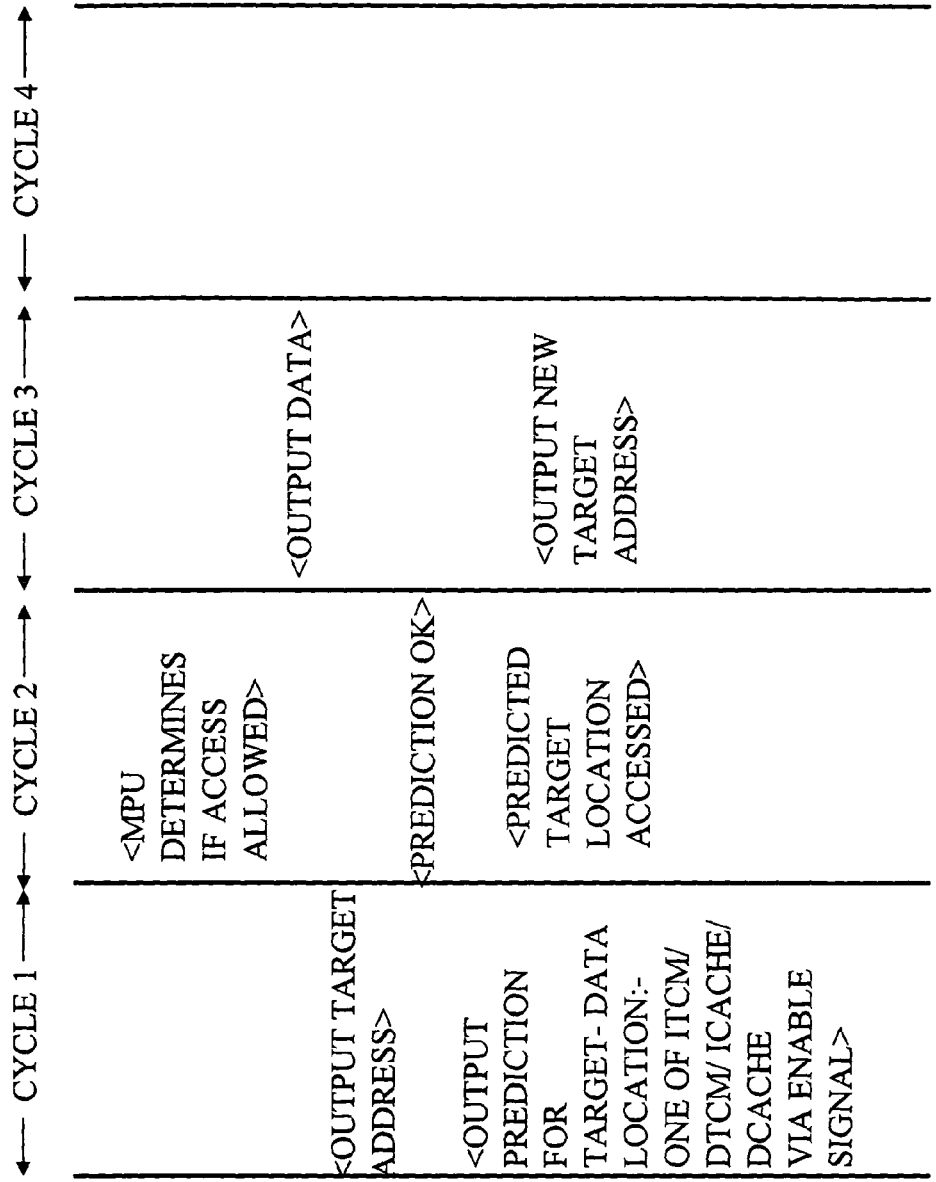
FIG. 3 schematically illustrates a cycle timing diagram for accessing target data in the system of FIG. 1A, but in which target memory prediction according to the present technique is employed.

FIG. 3 schematically illustrates a cycle timing diagram for accessing target data in the system of FIG. 1A, but in which (in contrast to FIG. 2) target memory prediction according to the present technique is employed. In the first processing cycle, the processor 110 is operable to output the target memory address for data access. In this same processing cycle, the data processor 110 is operable to output a prediction for the target-data location i.e. one of the ITCM 140, DTCM 142, I cache 150, D cache 152 and the data processing unit 112 outputs an enable signal to the appropriate one of these memory units. The target memory unit is operable to output data on the common bus 160 in response to this enable signal.

In the second processing cycle, the memory protection unit 120 determines whether or not access to the target memory address by the particular application is permitted. If the memory protection unit determines that access is in fact allowed then it outputs a prediction_OK signal to the processor 110 and the processor proceeds to access the target data in the second processing cycle.

In the third processing cycle, the target data is output onto the common bus 160. In the same cycle that the target data is output onto the bus 160 (i.e. third cycle) a new target address is output by the processor 110.

Comparison of the cycle timing diagrams of FIG. 2 and FIG. 3 reveals that without target prediction every load of data takes at least four processing cycles, whereas using the target prediction scheme, the vast majority of data accesses take three processing cycles. It is only in the case of a misprediction by the processor (which would correspond to a misprediction signal being output in cycle two) that the data access will take four processing cycles. For embedded data processing systems such mispredictions are likely to be very rare. Thus it can be seen that outputting a prediction for a target data memory location in the same processing cycle as the output of the target memory address by the processor 110, the data access time can be reduced.

Figure 4:
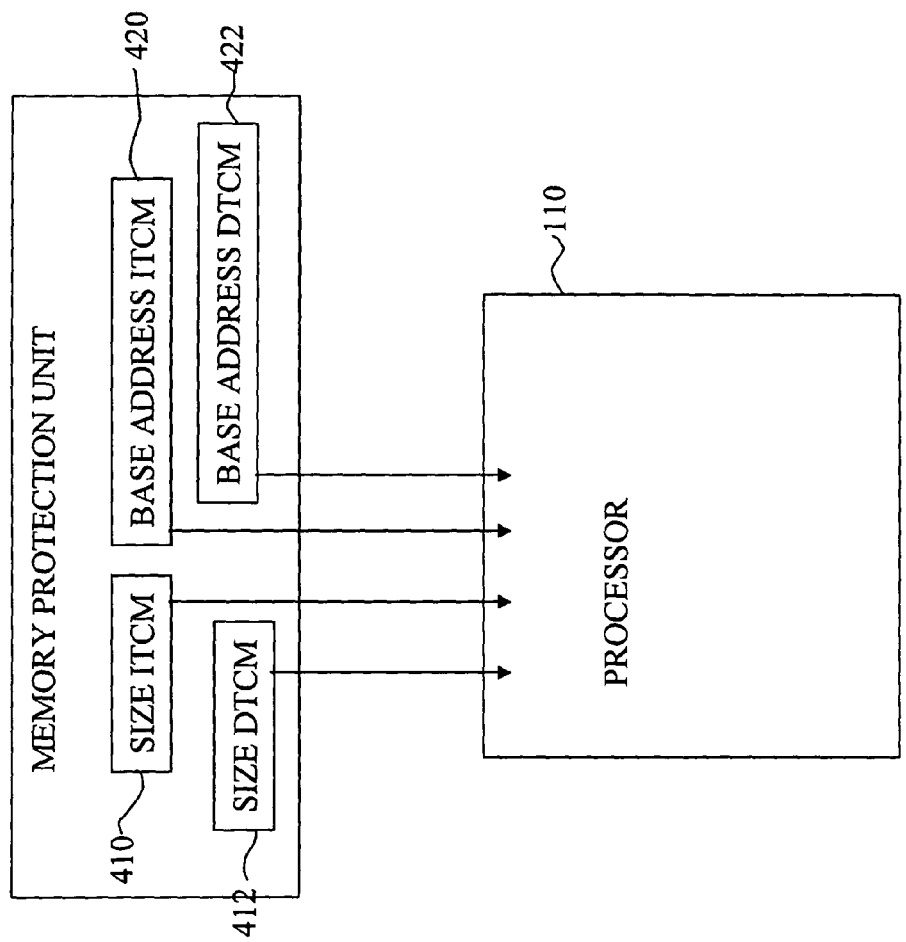
FIG. 4 schematically illustrates how the memory protection unit of FIG. 1A provides information to the processor to enable the processor to access a physical memory location corresponding to a target memory address.

FIG. 4 schematically illustrates how the memory protection unit 120 provides information to the processor 110 to enable the processor to access a physical memory location corresponding to a target memory address. FIG. 4 provides an example of the information that is provided to the processor 110 in the case of the tightly coupled memories 140, 142. In particular, to resolve the target memory addresses, the memory protection unit 120 provides to the processor 110 information with regard to the size of the ITCM 410, and information with regard to the size of the DTCM 412. However, a memory address specified by sizes alone would not be unique, so the memory protection unit 120 also provides the processor 110 with information with regard to a base address in physical memory associated with the ITCM 420 and a base address in physical memory associated with the DTCM 422. As described above with reference to FIG. 1B, the memory protection unit 120 has a memory region specifier associated with each of the ITCM 420 and DTCM 422, which includes a base address field 170 and a size field 180. The memory protection unit 120 also provides the processor 110 (and hence the prediction logic 113) with the sizes and base addresses of the I cache 150 and D cache 152.

Figure 5:
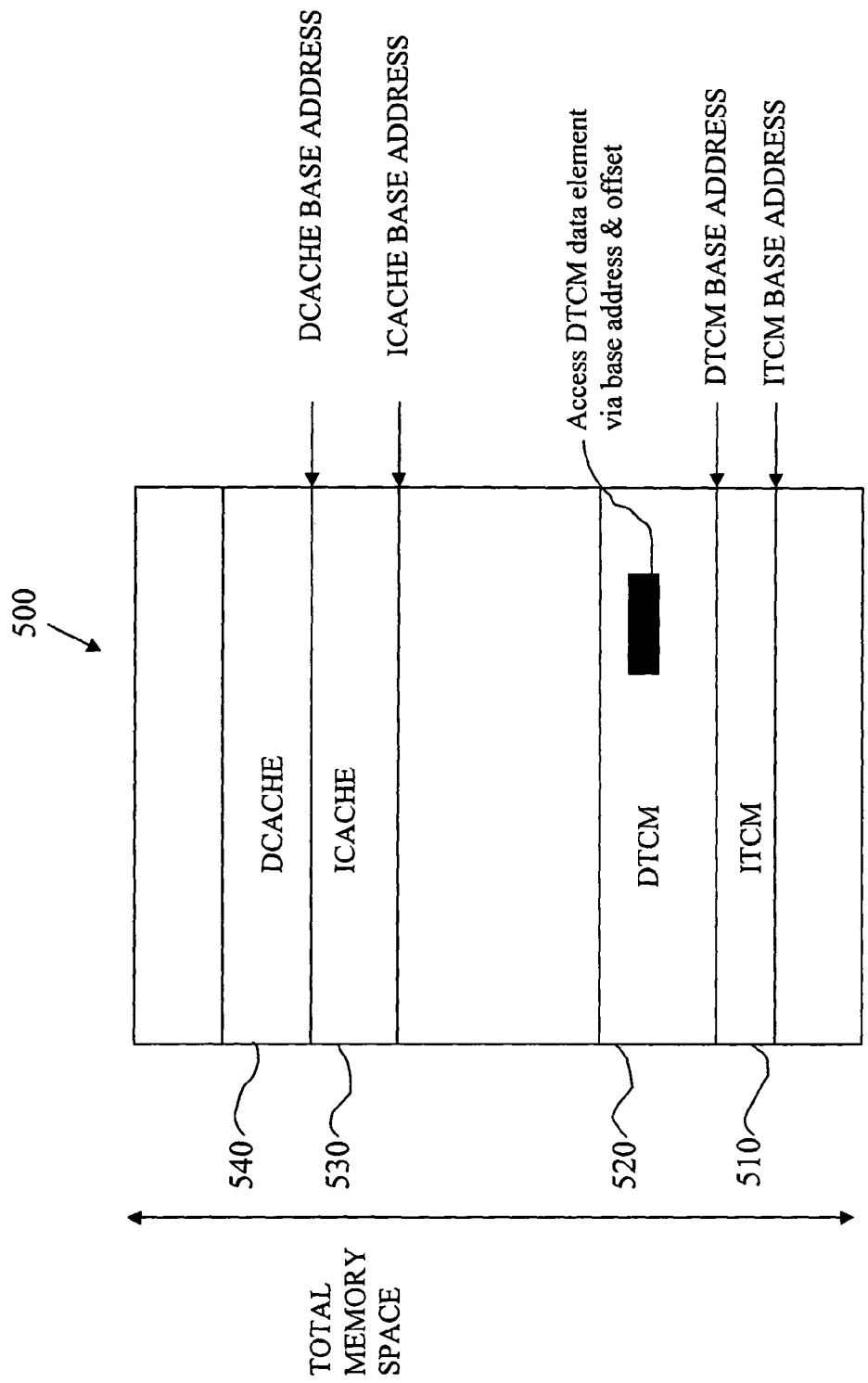
FIG. 5 schematically illustrates how data is arranged and indexed in the data processing device of FIG. 1A.

In the embodiment of FIG. 5, the sizes and base addresses of the memory units are obtained from the memory protection unit 120 of FIG. 1. However, in alternative embodiments, the base address and size of the ITCM 140 and DTCM 142 can be determined by the processor without reference to the memory protection unit 120 using information stored locally in the TCM control register 113.

In embodiments that have a memory management unit rather than a memory protection unit, the processor 110 maintains top and bottom position registers for each of the ITCM 140 and DTCM 142. In a memory management unit embodiment in which the TCMs are each mapped to a respective contiguous space of virtual memory and where the TCM size is constrained to be a power of two, the TCM region size can be derived directly from the top and bottom position registers by setting the TCM size to the smallest power of two size value that is greater than the difference between the top position register and the bottom position register. In the case of a misprediction of the target memory location in such an embodiment, the value stored in one of the top and bottom position registers is changed. In particular, if the load address value is smaller than the value currently stored in the top position register then the top position register is assigned to the load address value. Alternatively, if the current load address value is larger than the value stored in the bottom position register, then the current load value is assigned to the bottom position register. This reduces the likelihood of future mispredictions.

If either the ITCM 140 or DTCM 142 is remapped or has its size changed, then the processor 110 executes a sequence of instructions known as an Instruction Memory Barrier (IMB). The IMB is implemented before any load/store requests are made by the load/store unit 114.

FIG. 5A schematically illustrates how data is arranged and indexed in the data processing device of FIG. 1A. The block 500 represents the total memory space and this is sub-divided such that a first portion of memory addresses 510 is allocated to the ITCM 140, a second block of memory addresses 520 is allocated to the DTCM, a third block of memory addresses 530 is allocated to the I cache 150 and a fourth block of memory addresses 540 is allocated to the D cache 152. In this particular embodiment, the memory map represents a physical address space, but in alternative embodiments (having a memory management unit) the memory map represents a virtual address space. In the example of FIG. 5, each block of addresses allocated to the corresponding memory 140, 142, 150, 152 is a contiguous block of addresses, but it is noted that the address ranges assigned to a given physical memory device need not be contiguous.

Access to data in each of the ITCM 140, DTCM 142, I cache 150 and D cache 152 is performed using a base address corresponding to the memory range associated with that particular memory device and an offset value that specifies an offset relative to that base address. For example, to access a data portion 550 in the DTCM, the processor 110 uses the DTCM base address as an index into the appropriate region of the total memory space and use an offset relative to that base address to access the location of that data within the block 520.

FIG. 5 described above illustrates a memory map in which the memory regions are non-overlapping. However, in alternative embodiments, the memory protection unit 120 can define overlapping memory regions in the physical memory address space. Overlapping memory regions increase the flexibility of mapping the memory regions to physical memory devices. The memory protection unit manages such overlapping memory regions by applying a fixed priority scheme to determine which memory region takes priority in defining the memory attributes to be applied to a given memory portion where the given memory portion falls within more than one of the plurality of memory regions.

Figure 6:
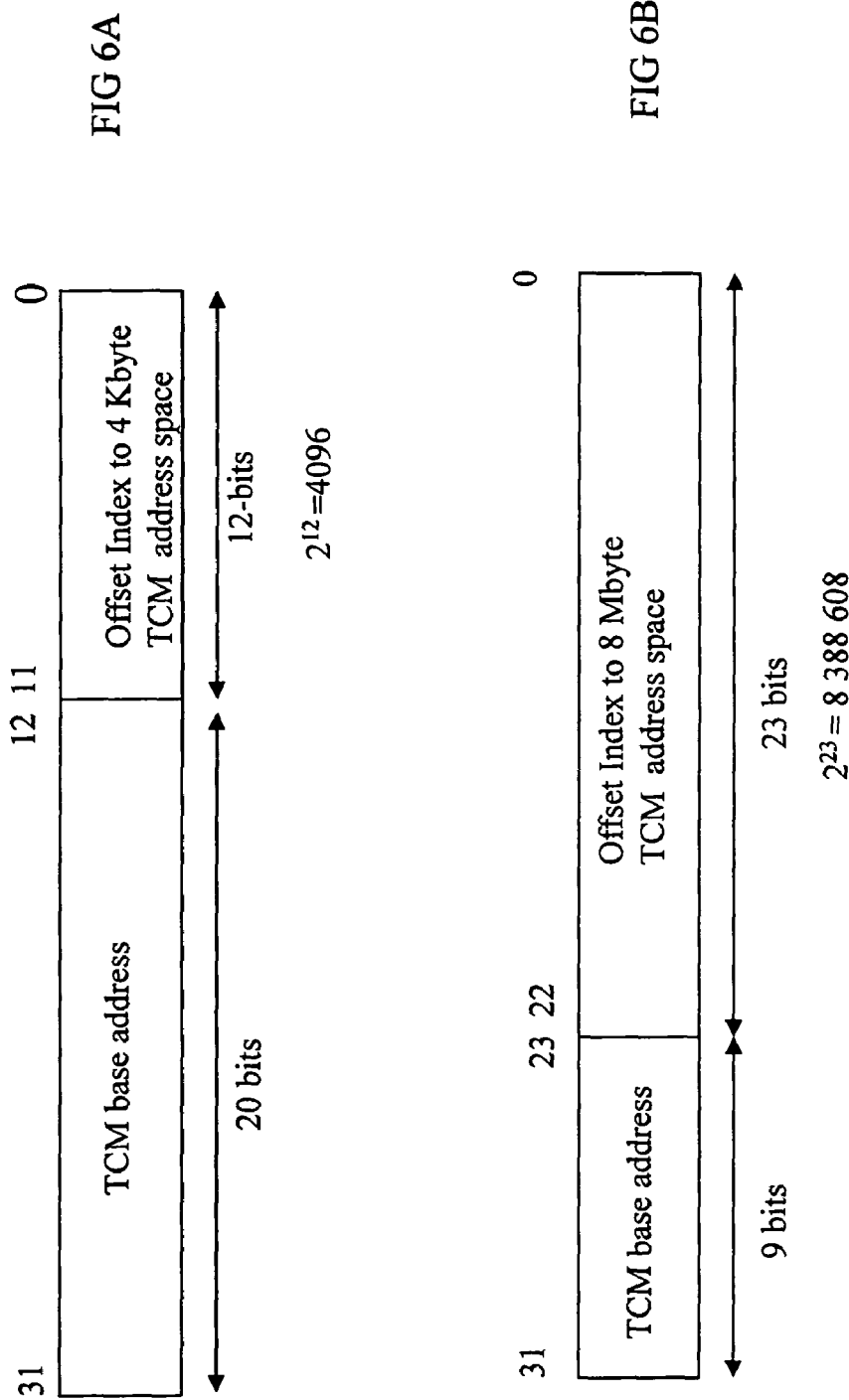
FIG. 6A schematically illustrates the format for a 32-bit address indexing a 4 kilobyte tightly coupled memory.
FIG. 6B. schematically illustrates a 32-bit address format for an 8 megabyte tightly coupled memory address space.

FIG. 6A schematically illustrates a format for a 32-bit address indexing a 4-kilobyte TCM, which is the smallest size of TCM supported in this particular embodiment. As shown bits [11:0] are used as the offset index to index locations within the TCM data block 520 (see FIG. 5) whereas bits [31:12] specify a base address for the TCM (either ITCM 140 or DTCM 142).

FIG. 6B schematically illustrates a 32-bit address format for an 8 megabyte TCM address space, which is the largest size of TCM supported by this particular embodiment. In this case, bits [22:0] are used as the offset index, since more bits are required to specify individual locations within the larger 8 megabyte address space. Bits [31:23] hold the TCM (ITCM or DCTM) base address.

Note that (as shown in FIG. 4) separate base registers 420, 422 are provided for the ITCM and DTCM. The ITCM base register 420 holds the current base address for the ITCM and the DTCM base register 422 holds the current base address for the DTCM. Bits [23:31] of the base register value are used in the memory prediction comparison.

Figure 7:
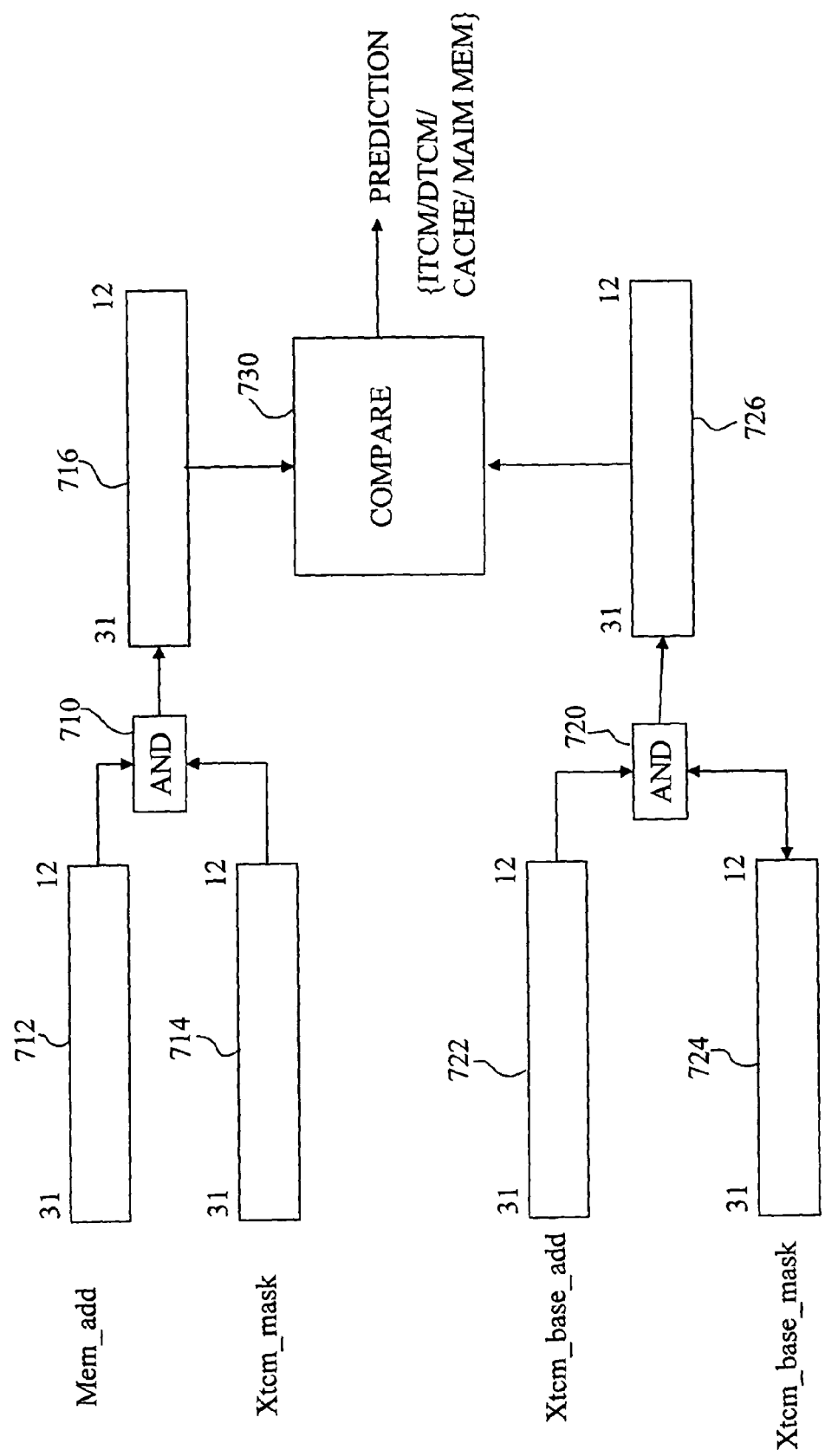
FIG. 7 schematically illustrates the prediction logic of FIG. 1A in more detail.

FIG. 7 schematically illustrates the prediction logic 113 of FIG. 1 in more detail. To perform the target memory prediction, only bits 12:31 of the 32-bit memory addresses are used. A first logical AND gate 710 is operable to receive as a first input, bits 12:31 of the target memory address generated by the processor 110 and to receive as a second input XTCM_mask data 740 comprising bits 12:31. In the example of FIG. 7 "X" represents either I or D since a different mask is provided according to whether the mask relates to the ITCM 140 or the DTCM 142. Note that the ITCM 140 and the DTCM 142 (see FIG. 1A) can differ in size (i.e. storage capacity) and will have different base addresses. The AND logic gate 710 outputs the result of the logical AND operation corresponding to a result value 716 and this is supplied as input to a compare module 730.

A similar process is performed using the base address associated with the ITCM 140 and the base address associated with the DTCM 142. In particular, a second AND logic gate 720 is operable to receive as a first input, bits 12:31 of an XTCM_base_address and to receive as a second input bits 12:31 of an XTCM_base_mask. This second AND gate 720 outputs a result value 726, which is also input to the compare unit 730. Again the particular base address and base mask will depend on whether the address represents the ITCM 140 or DTCM 142.

Note that a logic module as shown in FIG. 7 is provided for each of the ITCM 140 and the DTCM 142.

If the comparison module 730 determines that the result value 716 is equal to the result value 726 then this represents the target prediction is TRUE. Thus, for example, if X=I such that the masks represent the ITCM 140, then if the result values 716 and 726 are identical a prediction that the target data resides in the ITCM 140 is TRUE. Similarly, if the X=D and the compare unit 730 finds a match between the result values 716 and 726 then the DTCM prediction is TRUE. However, if both the ITCM prediction and the DTCM prediction are found by the respective compare modules 730 to be FALSE then the target prediction will be the Icache 150, Dcache 152 or the main memory 130. The mask values 714 and 724 used during the prediction of FIG. 7 are dependent upon the size of the associated memory unit. This is illustrated by FIGS. 8A to 8D.

Figure 8:
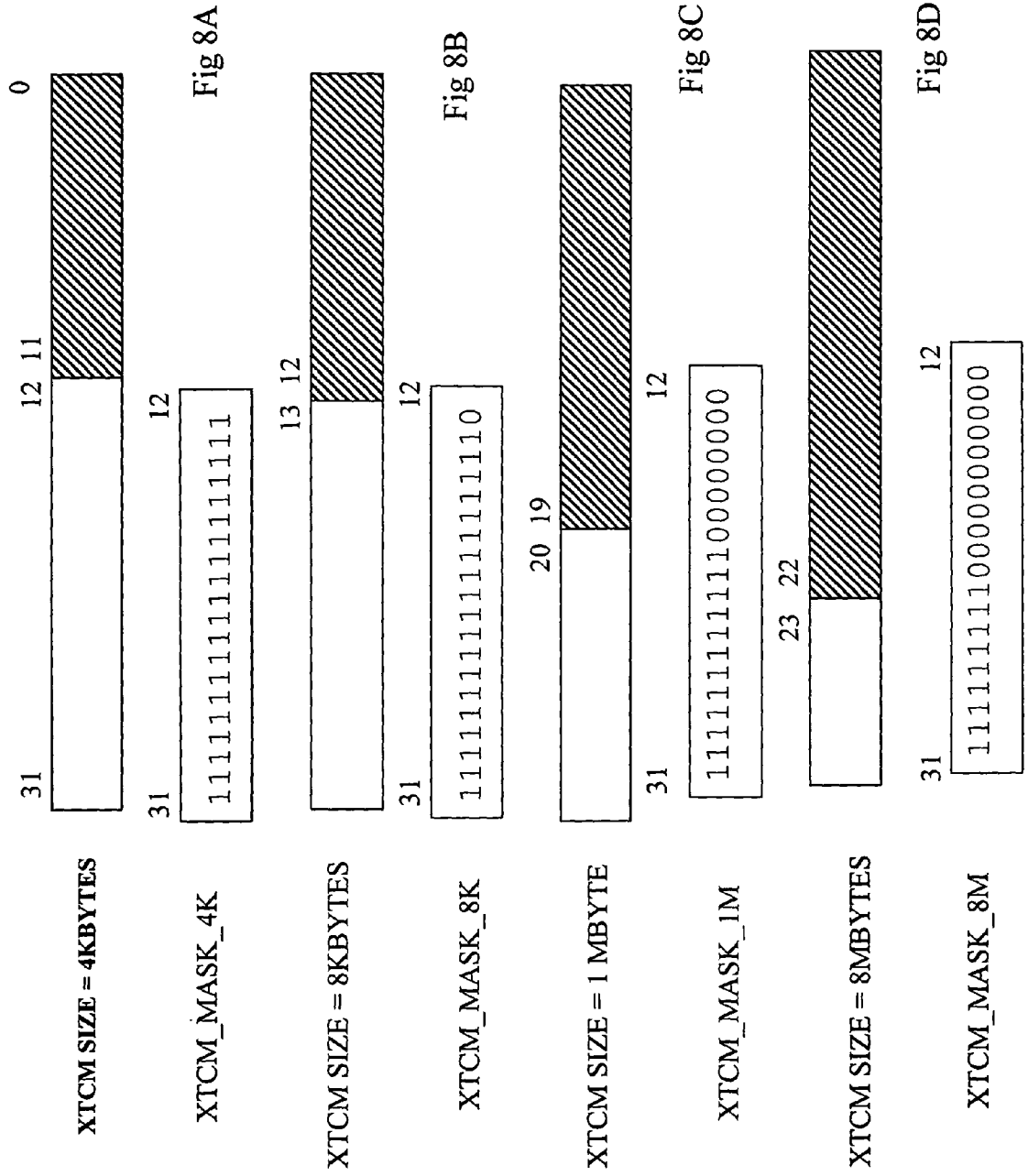
FIGS. 8A to 8D schematically illustrate the masks used to perform the prediction for four different memory array sizes.

FIGS. 8A to 8D schematically illustrate the masks used to perform the prediction for four different memory sizes. FIG. 8A schematically illustrates the mask for and the address-structure for a memory size of 4 kbytes. For a 4 kbyte memory size bits 0 to 11 are required to index the plurality of locations within the memory ($2^{12}$=4096). Since in FIG. 7 only bits 12:31 are used for the prediction and none of these bits are required to index offset values within the memory space the mask in this case comprises a sequence of twenty '1's. FIG. 8B schematically illustrates the structure of the 32-bit memory address for an 8 kilobyte memory size. In this case bits 0 to 12 are required to index offsets within the memory ($2^{12}$=8192). Since in this case bit position 12 is required to index the offset the mask value for this address location is 0 whereas the remaining 19 bit values of the 20-bit mask are all '1's.

FIG. 8C schematically illustrates a 32-bit address structure for a 1 megabyte memory size. In this case, bits 0:19 are required to index the offset. Since bits 12:31 are used for the comparison prediction bits 12 through to 19 must be set to '0' since these specify offset values. Accordingly in this case bits 12:19 of the mask are '0's whereas the remaining bits 13:31 are '1's.

FIG. 8D schematically illustrates a 32-bit memory address for an 8 megabyte memory size. In this case, bits 0:22 of the 32-bit address are required to index offsets within the memory. Accordingly, bits 12:22 of the corresponding mask are set to 0 whereas bits 13:31 are each set to '1'. Since in this particular embodiment the minimum memory size if 4 kilobytes and the maximum memory size is 8 megabytes it is clear that bits 22 to 31 of the mask will always comprise a sequence of '1's.

Figure 9:
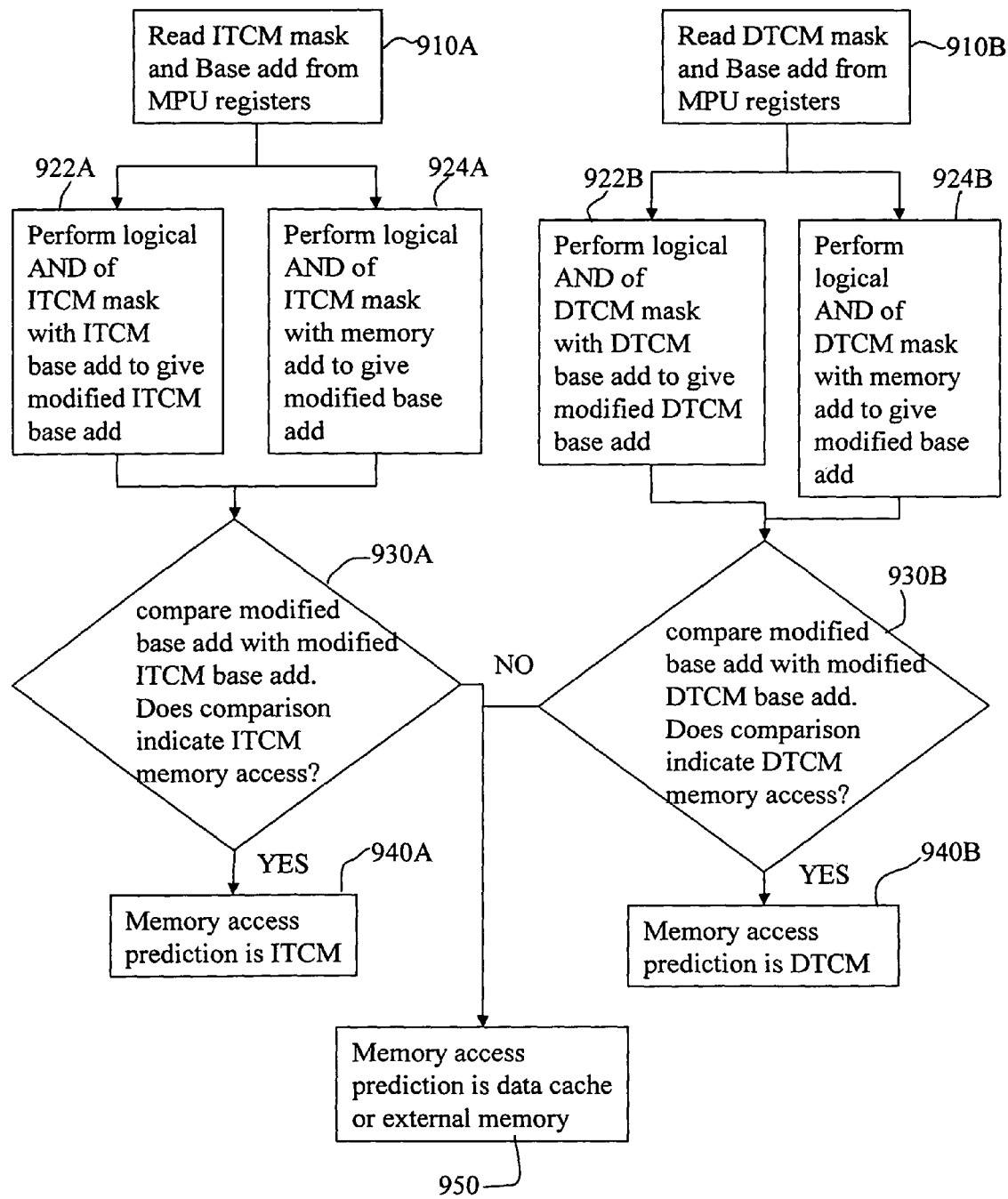
FIG. 9 is a flow chart that schematically illustrates how prediction of a target memory address is performed.

FIG. 9 is a flow chart that schematically illustrates how a prediction of the target memory address is performed. The process begins at stage 910A when the ITCM mask and base address are read from the MPU registers (see FIG. 4). Subsequently, at stage 922A a logical AND operation is performed between the ITCM base address and the ITCM mask. Note that the ITCM mask depends upon the size of the ITCM (as explained in FIGS. 8A to 8D). Since bits [31:23] are always a series of '1's for a maximum memory size of 8 megabytes, effectively the mask comprises an 11-bit mask corresponding to bits [22:12] whose values are dependent upon the size of the ITCM. Substantially concurrently with the performance of the logical AND operation at stage 922A a further logical AND operation 920 is performed at stage 924A, but this logical AND operation involves the 11-bit address mask corresponding to the ITCM and the memory address generated by the address generation logic 115 (see FIG. 1). The result of the logical AND operation performed at stage 922A will be denoted a "modified ITCM base address" whilst the results of the logical AND operation of stage 924A will be denoted a "modified base address".

At stage 930A the modified base address is compared with the modified ITCM base address and it is determined from the comparison whether or not the memory access is predicted to be in the ITCM. If the result of the prediction is that the data is in fact stored in the ITCM, then the process proceeds to stage 940A, whereupon an ITCM memory address prediction is output. However, if the result of the comparison at stage 930A indicates that the memory access was not an access to the ITCM then the process proceeds to stage 950. In this case, the memory access prediction is either the data cache or the external memory. In the event of a cache miss the data will be retrieved from main memory.

A sequence of events analogous to those performed at stages 910A, 922A, 924A, 930A, 940A is performed in parallel for the DTCM. In this case, the process beings at stage 910B, where the DTCM mask and base address are read from the MPU registers. The process proceeds to stages 922B where a logical AND between the DTCM base address and the DTCM mask is performed and stage 924B where a logical AND operation between the generated memory address and the 11-bit DTCM mask is performed. Next, at stage 930B, the modified base address generated at stage 924B is compared with the modified DTCM base address generated at stage 922B to determine whether the memory access is predicted to be in the DTCM. If at stage 930B the memory access is in fact predicted to be in the DTCM then the process proceeds to stage 940B whereupon a DTCM prediction is output. However, if at stage 930B the memory access is determined not to be in the DTCM then the process proceeds to stage 950. In this case, the memory access prediction is in either the data cache or external memory.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus for accessing a plurality of memories, said data processing apparatus comprising:
    address generation circuitry including logic for outputting to at least one of said plurality of memories, a target memory address corresponding to data to be accessed;
    target memory prediction circuitry including logic for outputting a prediction indicating in which one of said plurality of memories said target data is stored;
    wherein said target memory prediction circuitry is configured to output said prediction in the same processing cycle in which said address generation circuitry outputs said target memory address, and wherein said target memory prediction circuitry is configured to make said prediction using (a) at least one stored first base address value specifying a location in a memory map of an address range associated with a respective one of said plurality of memories and (b) a second base address value obtained from said target memory address output by said address generation circuitry.

2. Data processing apparatus according to claim 1, wherein said target memory address is one of a virtual memory address and a physical memory address.

3. Data processing apparatus according to claim 1, comprising memory management logic operable to determine in which of said plurality of memories, data corresponding to said target memory address resides.

4. Data processing apparatus according to claim 3, wherein said memory management logic is a memory protection unit.

5. Data processing apparatus according to claim 3, wherein said memory management logic is a memory management unit operable to translate a virtual memory address to a physical memory address.

6. Data processing apparatus according to claim 3, wherein said memory management logic comprises logic operable to determine if said prediction is correct and to output a prediction confirmation signal to said data processing apparatus in a processing cycle subsequent to said same processing cycle.

7. Data processing apparatus according to claim 6, wherein said data processing apparatus comprises misprediction recovery logic operable to resolve a misprediction by said target memory prediction circuitry if said prediction confirmation signal is not received.

8. Data processing apparatus according to claim 7, wherein said data processing apparatus is operable to output data accessed in accordance with said prediction in a processing cycle immediately following said subsequent processing cycle in response to receipt of said prediction confirmation signal.

9. Data processing apparatus according to claim 6, wherein said data processing apparatus is operable to output a further target memory address in said processing cycle immediately following said subsequent processing cycle.

10. Data processing apparatus according to claim 3, wherein said target memory prediction circuitry is operable to obtain said size of at least one of said plurality of memories from said memory management logic.

11. Data processing apparatus according to claim 3, wherein said target memory prediction logic is operable to obtain said size of at least one of said plurality of memories from at least one control register associated with a respective one of said plurality of memories.

12. Data processing apparatus according to claim 11, wherein said data processing apparatus is operable to set at least one value in said at least one control register to said target memory address when said prediction is determined to be incorrect.

13. Data processing apparatus according to claim 1, wherein said target memory prediction circuitry makes said prediction in dependence upon a size of at least one of said plurality of memories.

14. Data processing apparatus according to claim 13, wherein said target memory prediction circuitry makes said prediction using an address mask corresponding to said size.

15. Data processing apparatus according to claim 1, wherein said target memory prediction circuitry comprises a comparator operable to compare at least a portion of said target memory address with at least a portion of said stored first base address value to perform said prediction.

16. A data processing method for accessing data from at least one of a plurality of memories associated with a data processing apparatus, said method comprising:
    outputting to at least one of said plurality of memories, a target memory address corresponding to data to be accessed;
    outputting a prediction indicating in which one of said plurality of memories said target data is stored;
    wherein said prediction is output in the same processing cycle in which said target memory address is output, and wherein said prediction is made using (a) at least one stored first base address value specifying a location in a memory map of an address range associated with a respective one of said plurality of memories and (b) a second base address value obtained from said target memory address.

17. A computer program product embodied on a non-transitory computer-readable storage medium, said computer program product comprising:

address generation code operable to output to at least one of said plurality of memories, a target memory address corresponding to data to be accessed;

target memory prediction code operable to output a prediction indicating in which one of said plurality of memories said target data is stored;

wherein said target memory prediction code is configured to output said prediction in the same processing cycle in which said address generation code outputs said target memory address, and wherein said target memory prediction code is configured to make said prediction using (a) at least one stored first base address value specifying a location in a memory map of an address range associated with a respective one of said plurality of memories and (b) a second base address value obtained from said target memory address output by said address generation code.

18. A data processing apparatus for accessing a plurality of means for data storage, said data processing apparatus comprising:

address generation means for outputting to at least one of said plurality of means for data storage, a target memory address corresponding to data to be accessed;

target memory prediction means for outputting a prediction indicating in which one of said plurality of means for data storage said target data is stored;

wherein said target memory prediction means is configured to output said prediction in the same processing cycle in which said address generation means outputs said target memory address, and wherein said target memory prediction means is configured to make said prediction using (a) at least one stored first base address value specifying a location in a memory map of an address range associated with a respective one of said plurality of means for data storage and (b) a second base address value obtained from said target memory address output by said address generation means.

* * * * *